United States Patent [19]
Neidigh

[11] Patent Number: 5,245,919
[45] Date of Patent: Sep. 21, 1993

[54] APPARATUS FOR PEELING FRUITS OR VEGETABLES

[75] Inventor: Ronnie C. Neidigh, Pueblo, Colo.

[73] Assignee: Magnuson Corporation, Pueblo, Colo.

[21] Appl. No.: 18,899

[22] Filed: Feb. 17, 1993

[51] Int. Cl.⁵ .................. A23N 7/00; A23N 7/02
[52] U.S. Cl. ..................... 99/623; 99/516; 99/536; 99/625; 99/630
[58] Field of Search ............... 99/516, 519, 534, 536, 99/623–630, 634; 15/3.19, 3.2, 3.21, 3.11, 3.13, 3.14; 426/481–483; 134/65, 132

[56] References Cited

U.S. PATENT DOCUMENTS

| | | | |
|---|---|---|---|
| 3,134,413 | 5/1964 | Dorsa et al. | 99/627 |
| 3,192,974 | 7/1965 | Hickey et al. | 99/630 |
| 3,566,942 | 3/1971 | Smith | 99/625 |
| 3,602,280 | 8/1971 | Hill | 99/625 |
| 3,745,914 | 7/1973 | Wallace | 99/630 |
| 3,946,658 | 3/1976 | Smith | 99/623 |
| 4,062,985 | 12/1977 | Amstad | 426/483 |
| 4,132,162 | 1/1979 | Magnuson | 99/630 |
| 4,237,782 | 12/1980 | Bichel | 15/3.2 |
| 4,519,305 | 5/1985 | Vanosdall | 99/625 |
| 4,827,836 | 5/1989 | Neidigh | 99/629 |

Primary Examiner—Timothy F. Simone
Attorney, Agent, or Firm—Robert Charles Hill

[57] ABSTRACT

Apparatus for continuously peeling fruits or vegetables comprising a substantially horizontal rotary drum having its wall formed by a plurality of circumferentially-spaced parallel shafts, each shaft being individually rotatable about its own axis and having an abrasive surface, means for rotating the drum in one direction and means for rotating the shafts in the opposite direction, a rotatable helicoidal conveyor mounted concentrically within the drum and with its periphery adjacent the interior surface of the drum and means for rotating the conveyor in a direction opposite to that of the drum. The apparatus further includes a set of rollers located at one end of the drum which support registration of the rotating abrasion shafts with the means for rotating the abrasion shafts.

7 Claims, 6 Drawing Sheets

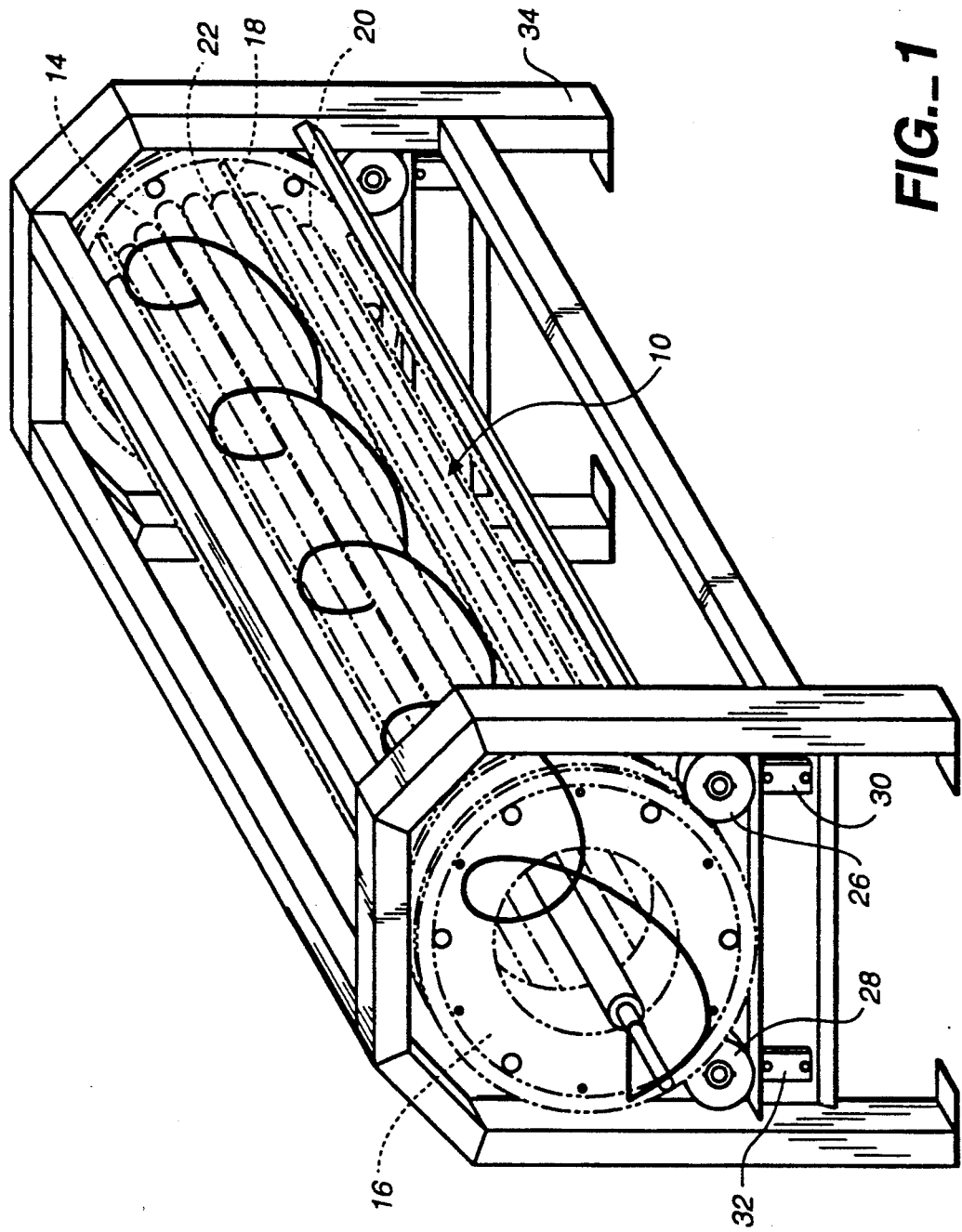
FIG._1

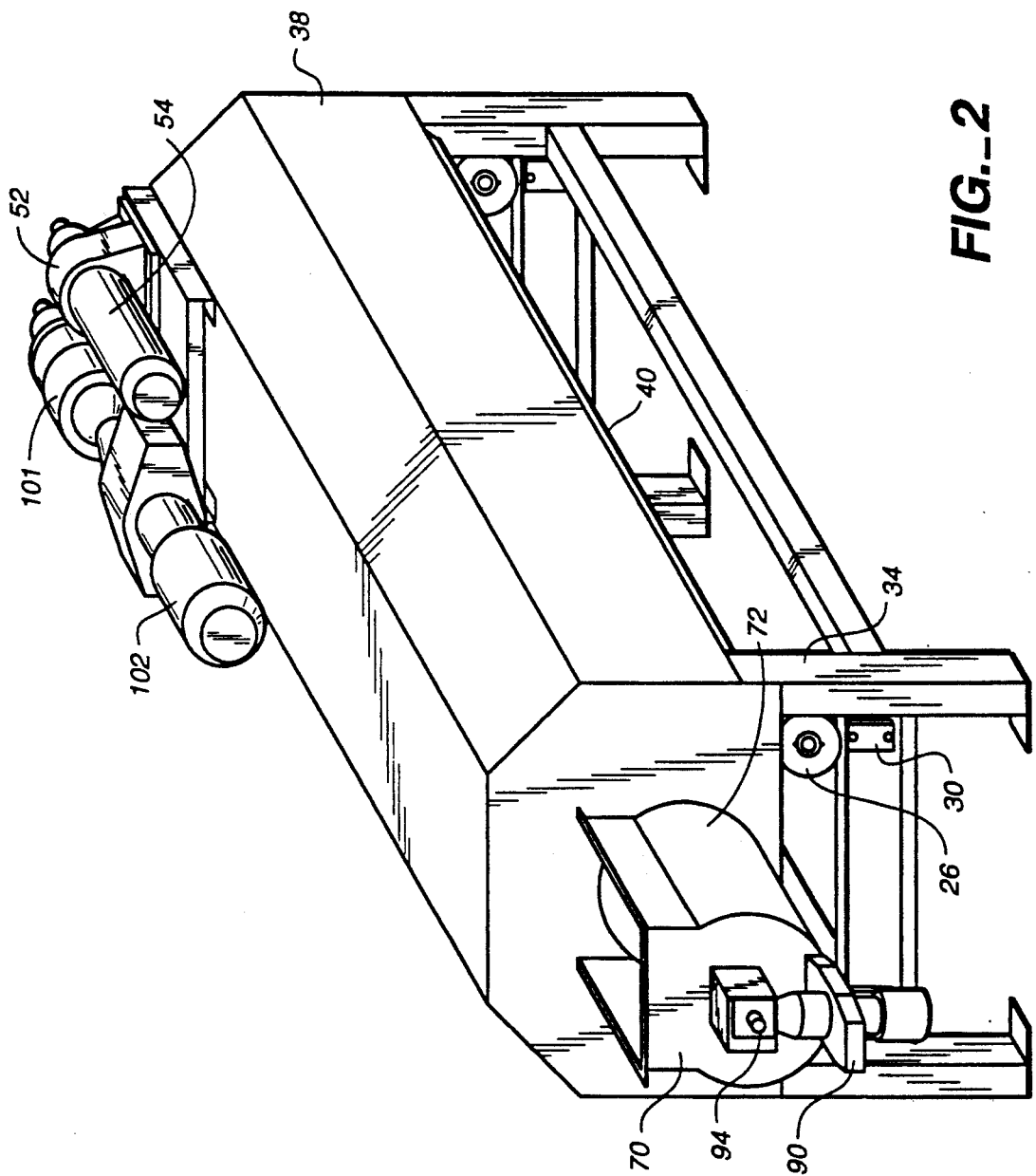

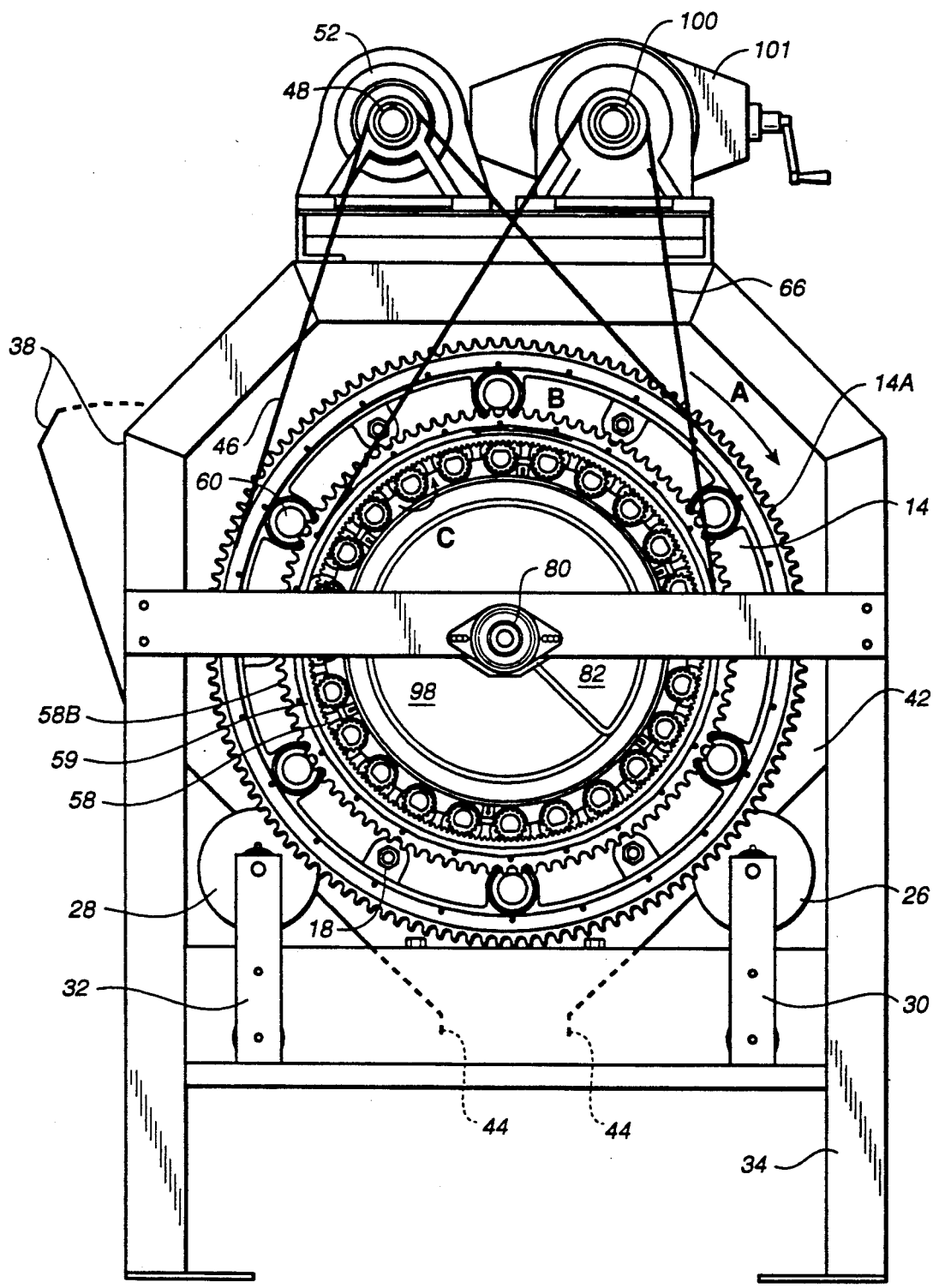
FIG._3

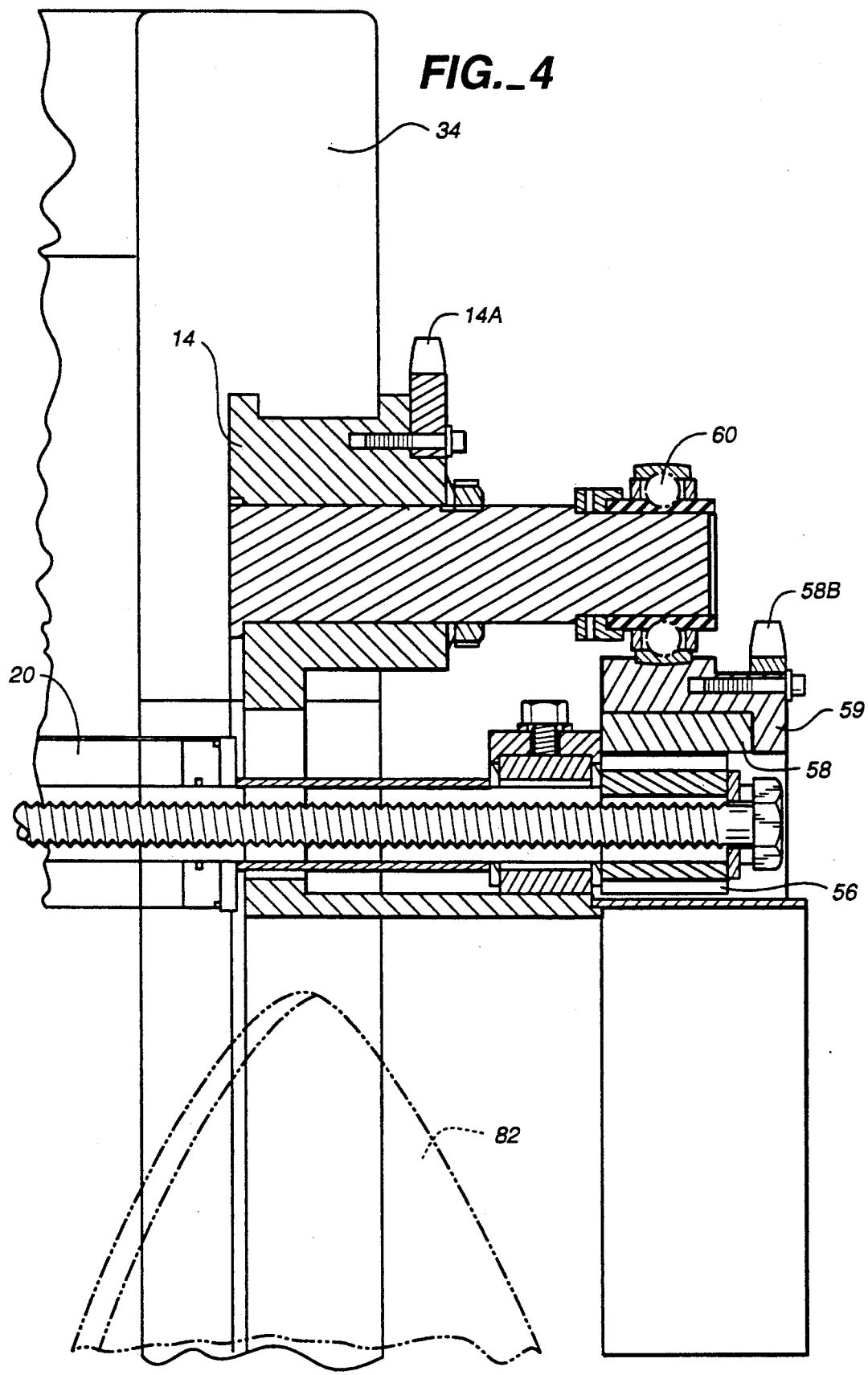
FIG._4

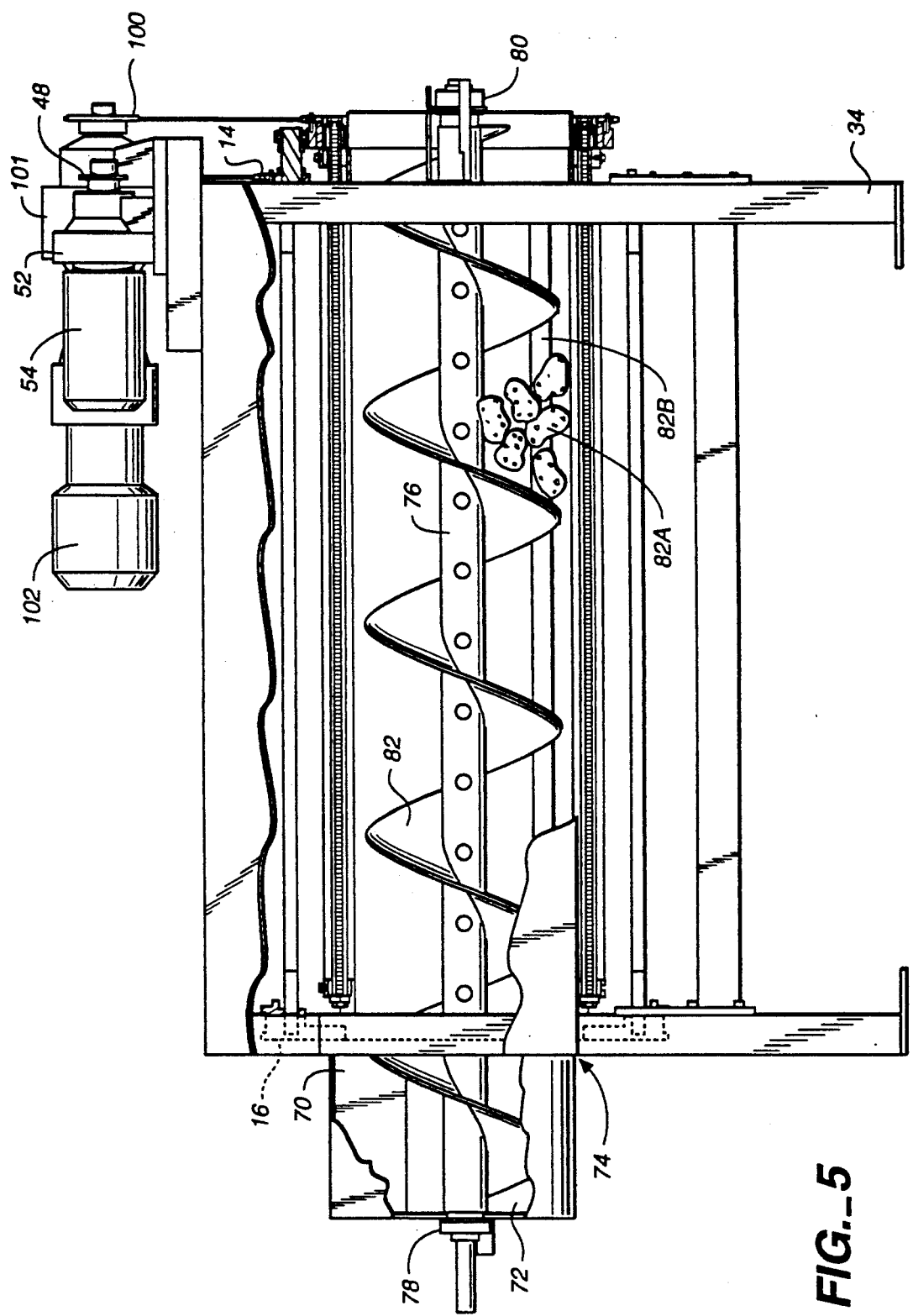
FIG._5

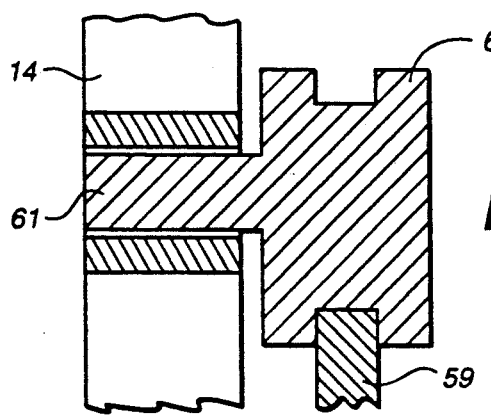
FIG._6
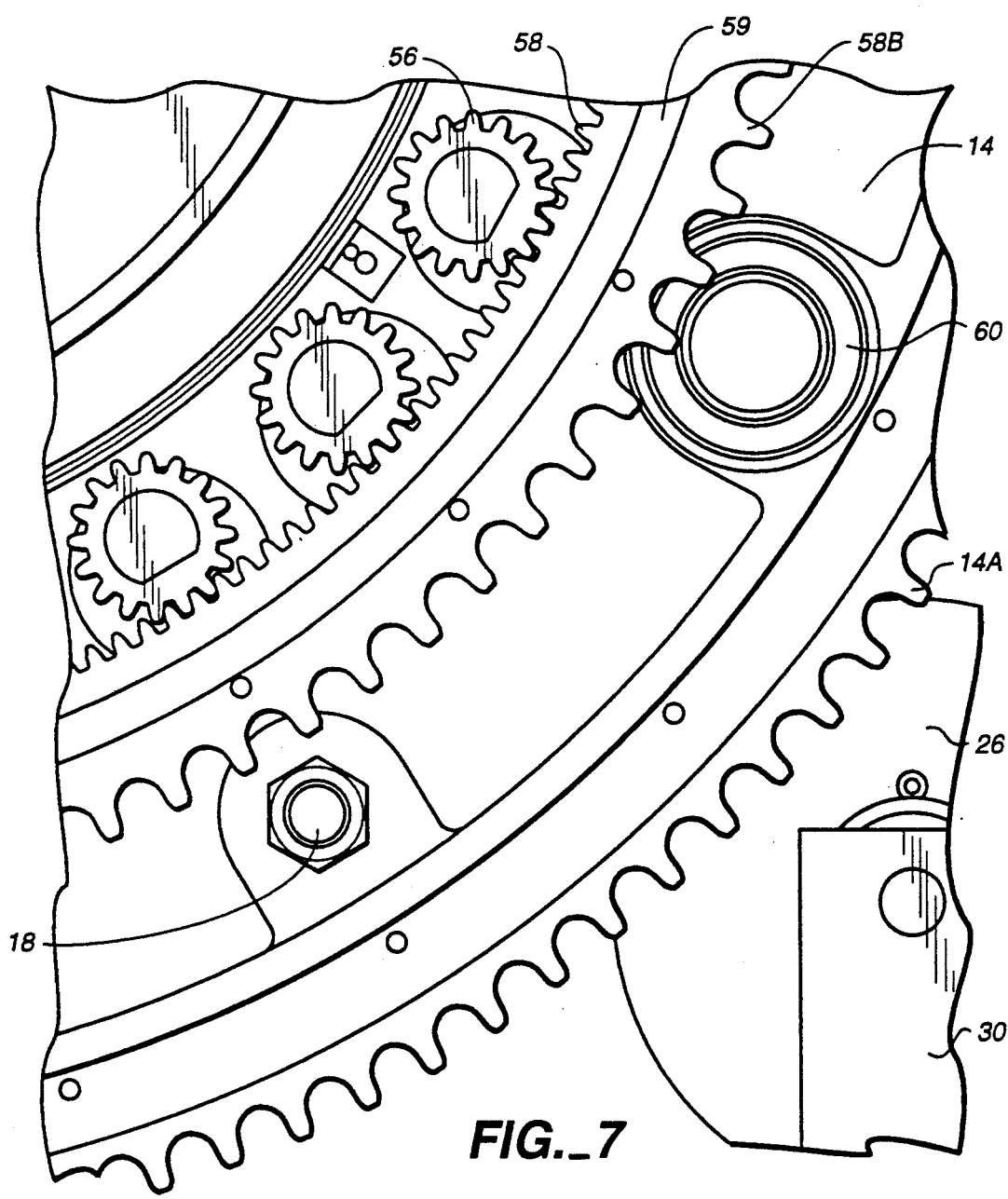
FIG._7

APPARATUS FOR PEELING FRUITS OR VEGETABLES

The present invention relates to apparatus for peeling and/or washing and/or scrubbing fruits or vegetables, and more particularly, to apparatus which removes the epidermis of the fruit or vegetable by an abrasive and/or brush process.

The removal of the epidermis of various fruits and vegetables by abrasion is generally well known, as disclosed by U.S. Pat. No. 3,134,413 to Dorsa, et al., which is incorporated herein by reference. It is obviously essential that the entire surface of the individual fruit or vegetable contact the abrasive surface for an appropriate period of time if complete and satisfactory peeling is to be accomplished. This necessary or essential condition can be satisfied relatively easily if the rate of production is limited; potatoes placed in a single layer on a moving abrasive surface can be removed when visual observation indicates the peeling is complete. However, known apparatus, presumably designed for high production, has failed to meet the essential condition in that the potatoes, for example, fed thereto en masse are abraded unequally, some of the potatoes emerging but partially peeled while others have been excessively abraded so as to involve a highly-undesirable waste.

Accordingly, it is a general object of the present invention to provide a peeling apparatus for fruits or vegetables, and particularly, potatoes, which is effective in its function even under very high production rates.

It is a feature of the present invention to provide a peeling apparatus which is continuous in its operation so that unpeeled fruit or vegetables delivered continuously to the entrance end of the apparatus pass steadily through the apparatus to emerge a short time later in the desired peeled state, thus avoiding interruptions experienced during a "batch-type" operation so as to expedite the peeling process.

Additionally, it is a feature of the invention to provide a continuous peeling apparatus wherein the fruits or vegetables can be delivered thereto in relatively large quantities that are subjected to a tumbling action during progress through the apparatus so that each individual fruit or vegetable is exposed to an abrasive surface or surfaces whereby complete as well as expeditious peeling is effected.

It is another feature of the invention to provide a peeling apparatus wherein the advance and tumbling of the fruit or vegetables through the apparatus are made adjustable so that although complete peeling of all the fruits or vegetables is achieved, yet excessive peeling and the resultant waste is avoidable.

A related feature of the invention is the arrangement of the peeling apparatus so that the mentioned adjustments can be made during the peeling operation in accordance with the visually observed results.

Yet another feature of the invention is the provision of a peeling apparatus that incorporates a particularly effective water spray arrangement for separating the abraded particles from the peeled fruits or vegetables.

Yet a further feature of the invention is the provision of an arrangement for conveying or advancing fruits or vegetables thorough the apparatus which simultaneously functions to provide a moving water spray for cleansing the peeled fruits and vegetables.

In accordance with one aspect of the invention, the mentioned arrangement for advancing the fruits or vegetables additionally functions as one abrasive element for effecting the peeling operation.

Another specific aspect of the invention is the provision of abrasive elements in the form of bristles or brushes which are of particular utility in the peeling of potatoes so that the "eye" portions are effectively abraded and thus peeled.

These as well as additional objects and features of the invention will become more apparent from a perusal of the following description of the structure illustrated in the accompanying drawings wherein:

FIG. 1 is an isometric view of a peeling apparatus embodying the present invention, portions of its exterior being broken away to illustrate certain interior structural details.

FIG. 2 is an isomeric view of the apparatus,

FIG. 3 is an elevational view of an end of the peeling apparatus,

FIG. 4 is a sectional view of the roller assembly,

FIG. 5 is a sectional side view illustrative of the action of the peeling apparatus on potatoes, FIG. 6 is a cutaway sectional view of a roller, FIG. 7 is a cutaway end view of the roller-planetary gear assembly.

Generally, the peeling apparatus embodying the present invention includes a rotary drum 10 having an abrasive interior surface that is preferably mounted for rotation about substantially a horizontal axis together with means for advancing the fruits or vegetables to be peeled from the entrance to the exit end of the drum or from the left to right, as viewed in FIGS. 1 and 2 and 5.

More particularly, the rotary drum 10 includes a pair of rings 14, 16 that are joined and supported in spaced, parallel relation by series of tie rods 18. The rings 14, 16 are provided with aligned bores which rotatably receive the respective ends of a -plurality of shafts 20, each shaft having an abrasive material on its exterior surface. The shafts 20 are rather closely spaced circumferentially around the rings 14, 16, so that the interior abrasive surface of the drum 10 formed by the plurality of shafts is interrupted by small apertures or openings 22 that will permit the abraded peel of the fruits or vegetables to pass therethrough but will preclude the passage of even the smallest fruit or vegetable being peeled. The character of the abrasive surface on the shafts will vary dependent on the particular fruit or vegetable which is to be handled by the apparatus, but in the case of potatoes, for example, such abrasive surface can be formed by the application of a granular outer coating to the shafts. If desired, certain portions of the shafts 20 may be provided with short bristles 24, as indicated in FIG. 6, to facilitate the cleansing of the "eye" portions of potatoes.

The entire drum 10, as described, is supported for rotation on pairs of rollers 26, 28 upon which the drum rings 14, 16 may rest. The rollers 26, 28 in turn are suitably rotatably supported in brackets 30, 32 on the generally rectangular frame 34. As shown in FIG. 2, from the side members of the frame 34 a cover 38 of generally inverted U-shape is removably secured, as shown at 40, to lower and appropriately enclose the entire rotary drum 10.

As shown in FIG. 3, underneath the drum 10 a trough 42 is supported from the rectangular frame 34 to receive any abraded particles, such trough 42 being tapered to a central opening 44 through which the particles may be ultimately withdrawn to the sewer.

In order to effect the mentioned rotation of the entire drum 10, the ring 14 at the discharge end of the apparatus is provided on its perimeter with gear teeth 14A that are engaged by an endless sprocket chain 46 that passes around the ring and around the ring and around a small sprocket 48 connected through a fixed speed reduction unit 52 to a drive motor 54 (FIG. 2) located at the exit end of the apparatus. The drive connections are such that energization of the motor 54 effects rotation of the drum 10 in a counterclockwise direction, when viewed from the entrance end of the apparatus, as indicated by the arrow A in FIG. 3, and preferably, the rate of rotation of the drum can be varied between 10 and 50 revolutions per minute.

Preferably, in addition to the rotative motion of the entire drum 10, means are provided to effect rotation of the individual shafts 20 to further enhance the abrasive peeling process. For this purpose, each shaft 20 projects through and slightly beyond the mounting ring 14 at the exit end of the apparatus and carries a planetary gear 56 that is suitably fixed thereto and is arranged to mesh with an internal ring gear 58. As shown in FIGS. 4 and 7, registration of the planetary gear 56 with the internal ring gear 58 is maintained by a plurality of rollers 60 which are journalled about a common diameter onto drum support ring 14 and which rotatably engage a gear support ring 59 to which the ring gear 58 is concentrically bolted.

As illustrated most clearly in FIG. 4, the gear support ring 59 also supports external ring gear 58B outwardly between the mounting that is in meshing engagement with a sprocket chain 66 (FIG. 3) that passes over the top of the ring gear 58 and is driven by sprocket 100 through gear box 101 and motor 102. Thus, the entire ring gear 58 is driven in the direction opposite of drum 10. Consequently, as the entire drum 10 is rotated in the mentioned counterclockwise direction, the planetary gears 56 will partake of an epicyclic motion around the interior of the internal ring gear 58 and individual counterclockwise motion of the shafts 20 will result. Preferably, the gear ratios are such that as the drum speed is varied from 10 to 50 r.p.m., a rotative speed of the shafts of from 150–1300 r.p.m., will be achieved.

Referring to FIGS. 2 and 5, in order to introduce fruits or vegetables into the rotary drum 10, a vertically disposed hopper 70 is positioned on the top of a generally cylindrical feed housing 72 which is mounted on the frame 34 adjacent the entrance end of the rotary drum 10 and in alignment therewith. The fruits or vegetables dropped into such hopper 70 are moved from the cylindrical feed housing 72 through the rotary drum 10 by a helicoidal conveyor, generally indicated at 74, that includes a long shaft 76 rotatably supported on suitable bearings 78, 80 at the end of the feed housing 72 and at the exit end of the apparatus so that the drum 10 and shaft 76 are coaxial. The shaft 76 supports a rigid helicoid 82 that has a left hand thread and a peripheral dimension slightly less than the interior diameter of the cylindrical feed housing 72 and the rotary drum 10 itself. The shaft 76 projects beyond its bearing at the entrance end of the apparatus and is driven by a variable speed reducer and motor 90. The drive connections are such that the helicoid 82 is rotated in a clockwise direction when viewed from the entrance end of the apparatus, as indicated by the arrow B in FIG. 3 and at a speed which may be varied between 1 and 50 revolutions per minute, such rotation serving to advance the fruit or vegetables through the feed housing 72 and the rotary drum 10 after the general fashion of a conventional screw conveyor. The surfaces of the helicoid 82 are smooth in order to enhance the rate of peeling.

In order to cleanse the fruits or vegetables during the peeling operation of the abraded peeled material, a spray of water is preferably introduced into the interior of the rotary drum, such water serving to carry the material downwardly through the apertures 22 between the abrasive shafts 20 and into the trough 42 thereunder. In accordance with an additional aspect of the present invention, such water spray is effectively introduced from the central axis of the rotary drum 10 and more particularly through the shaft 76 supporting the helicoid 82. As shown in FIG. 5, the shaft 76 is made hollow though its entire length except at the exit end of the apparatus and is formed with a plurality of small transverse holes 92 along its length within the interior of the rotary drum 10. Water through a suitable conduit 94 at the entrance end of the apparatus is supplied to the end of the hollow shaft 76 and passes therethrough to emerge from the described holes or apertures 92 as a fine spray which projects itself radially outwardly and also rotates as the shaft itself rotates. Very effective cleansing, particularly when a rather large load of fruits or vegetables is passing through the rotary drum 10 is achieved by the described arrangement.

The described spray thoroughly cleanses fruits or vegetables and the peeled and cleansed product emerges from the exit end of the rotary drum 10.

While the general operational characteristics of the described apparatus may be obvious from the foregoing structural description, a brief resume of its operation in the peeling of potatoes will indicate more clearly why effective peeling of large quantities of potatoes can be achieved. Potatoes may be introduced sufficiently rapidly into the apparatus to maintain a level of approximately half the height of the rotary drum 10. If the rotary drum 10 is viewed transversely looking in the direction of advance of the potatoes, it will be immediately obvious that the counterclockwise rotation of the drum 10 will impart a transverse counterclockwise tumbling action on the potatoes so that a continuous circulation in this direction is experienced to bring different individual potatoes of the entire mass into contact with either the abrasive shafts 20 or with the abrasive helicoid 82, if the latter is employed. Furthermore, it will be quite obvious that the clockwise rapid rotation of the individual shafts 20 will not only abrade the surface of an adjacent potato, but will also tend to effect a simultaneous rotation of that individual potato to thus bring the abrasive surfaces of the shafts into contact with various portions of the potato.

Not quite so obvious is the action of the helicoid 82 itself in enhancing the peeling process. In the first place since the helicoid 82 rotates in a clockwise direction, it tends to impart a clockwise rotation of the mass of potatoes and particularly those located near the axis of the helicoid which are not experiencing the opposite rotative forces of the rotary drum 10 so that in cooperation with the rotary drum, an additional transverse tumbling of the potatoes is experienced to periodically bring those potatoes near the axis outwardly into contact with the abrasive drum 10 and those initially in contact with the drum into a more central position.

In the second place, as can best be visualized by specific reference to FIG. 5, as the helicoid 82 turns and that segment indicated at 82A in FIG. 5 moves upwardly, a tendency to lift the adjacent potatoes is experience while at the same time a space is vacated adjacent the rear face of the next turn 82B of the helicoid so that, in turn, potatoes may drop into such vacated area, thus, ultimately, achieving a tumbling of the potatoes in a direction axially or longitudinally of the apparatus. In summary, it can be seen that both a transverse and longitudinal tumbling of the potatoes is continuously experienced during progress of the potatoes through the apparatus, and as a result of such continuous tumbling, substantially equivalent exposure of the surface of each individual potato to the abrasive shafts 20 or helicoid 82 is experienced. Not only is the peeling process thus equalized, but through adjustment of the rotative speeds of the drum 10, the individual shafts 20, and the helicoid 82, the desired amount of peeling can be achieved so that waste is eliminated. Such adjustments are easily made during operation while observing the peeled product.

The effectiveness of the apparatus can be more clearly indicated when it is realized that a rotary drum 10 seven feet in length and two and one-half feet in diameter is capable of peeling potatoes at a rate of 20,000 pounds per hour.

The construction involving the internal stationary gear 58 secured to the gear support ring 59 engaged with rollers 60 journalled to the drum support ring 14 introduces a number of advantages over U.S. Pat. No. 3,134,413 wherein registration rollers were mounted onto the ends of the abrading shafts 56 so that the diameter of the rollers was limited by the distance between the shafts.

One advantage of the present invention is that it permits placement of the rollers 60 on a radius of the gear support ring 59 and the drum support ring 14 that is independent of the diameter of the locus of the centers of the abrading shafts 56 so that the diameter of the rollers 60 is not limited by the distance between the shafts but can be selected to have a size that provides greater support than the construction of the prior art.

With U.S. Pat. No. 3,134,413 the alignment of each supporting abrasion shaft had to be accomplished with respect to BOTH aligning the planetary gear with the internal gear AND aligning the roller on the end of the abrading shaft with a shoulder concentric with the internal gear. This could be accomplished most economically by machining the internal gear and the shoulder as one part. This is an expensive fabrication procedure and when either the internal gear or the shoulder became worn or damaged, the entire part had to be replaced. With the construction of the present invention the roller 60 is supported on the drum supporting ring 14 separate from planetary gear 56 on the abrading shaft 20. This requires less precision fabrication and allows either the internal gear 58 or the gear support ring 59 to be replaced independently, thereby significantly reducing maintenance costs.

Another advantage of the present invention is that any one of the support rollers 60 may be replaced by simply withdrawing the roller 60 without disturbing any of the abrading shafts 20. This is an especially important advantage in situations where rollers 60 having sections made from one material (e.g., nylon or rubber) must be substituted by rollers 60 having sections made from another material (e.g., stainless steel) as is occasionally required when there is a difference in environment.

A further advantage is that each roller assembly may comprises a solid roller bearing 63 made of ceramic and running on the gear support ring and running inside a hardened steel sleeve 61 pressed into the drum support ring 14. This construction could not be adapted to the prior art construction where the roller is pressed onto the end of the abrading shaft.

A still further advantage is that the entire drum assembly can be conveniently separated from the stationary internal gear and gear support ring assembly. This capability is useful when it is required to clean the drum or replace elements of the drum.

Various modifications and/or alterations can obviously be made in the described structure without departing from the spirit of the invention. Consequently, the foregoing description of one embodiment of the invention is to be considered as purely exemplary and not in a limiting sense; and the actual scope of the invention is to be indicated by reference to the appended claims.

What is claimed is:

1. Apparatus for continuously peeling fruits or vegetables which comprises:
   an array of abrading shaft means, parallel to and evenly spaced from one another on a circumference thereby forming a drum for abrading said fruits and vegetables;
   each said shaft means having an abrading surface selected according to conditions required to peel said fruit or vegetable;
   a first drum support ring wherein one end of each said abrading shaft is journalled to said first support ring;
   a second drum support ring wherein another end of each said abrading shaft means is journalled to and protrudes through said second support ring;
   a plurality of planetary gears, one said planetary gear mounted on said protruding end respectively;
   an internal gear engaging all of said planetary gears;
   an external gear support ring and sprocket secured concentrically to said internal gear and having a periphery;
   means for driving said internal gear and secured gear support ring thereby turning said gear support ring and internal gear; and
   a plurality of roller means distributed around and in rolling contact with said periphery for enabling said array and attached drum support rings to be rotated and said abrading shaft means to rotate relative to said array;
   means for securing an end of each said roller means to said second drum support ring said internal gear support ring thereby enabling said array and attached drum support rings to be rotated and said abrading shaft means to rotate relative to said array;
   means for rotating said drum;
   a rotatable helicoidal conveyor mounted concentrically within said drum and with its periphery adjacent the interior surface of said drum; and
   means for rotating said conveyor in a direction opposite to that of said drum.

2. Apparatus for continuously peeling fruits or vegetables according to claim 1 wherein said roller means are nylon.

3. Apparatus for continuously peeling fruits or vegetables according to claim 1 wherein said roller means are stainless steel.

4. Apparatus for continuously peeling fruits or vegetables according to claim 1 wherein said roller means are rubber.

5. Apparatus for continuously peeling fruits or vegetables according to claim 1 wherein said planetary gears are plastic.

6. Apparatus for continuously peeling fruits or vegetables according to claim 1 wherein each of said roller means is removable from said apparatus.

7. The apparatus of claim 1 which also washes fruits and vegetables.

* * * * *